Aug. 10, 1926.  
H. T. ANDERSON  
1,595,333  
CONNECTING BAR AND METHOD OF MAKING THE SAME  
Filed June 6, 1924  2 Sheets-Sheet 1
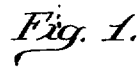
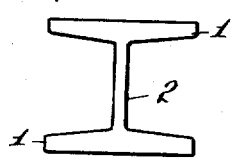
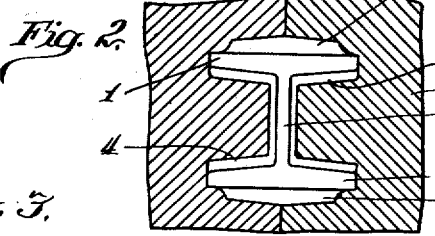
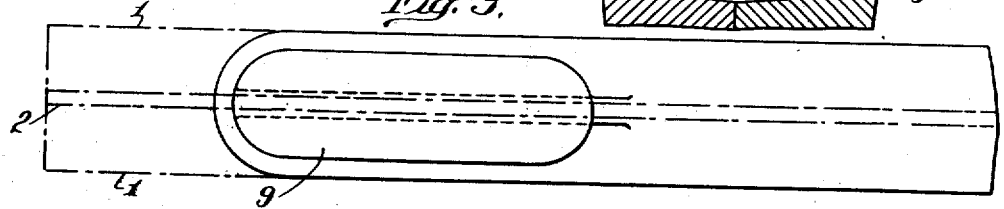
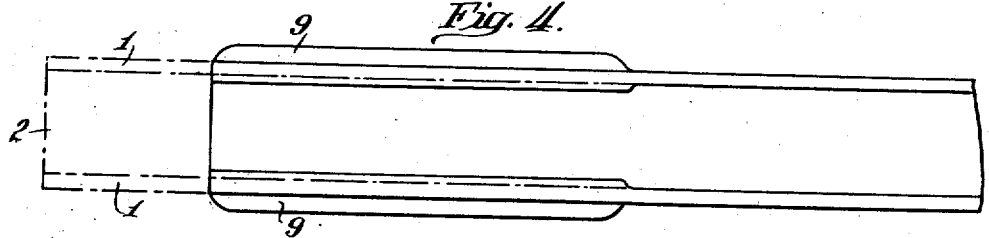
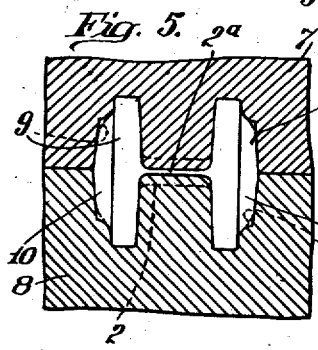
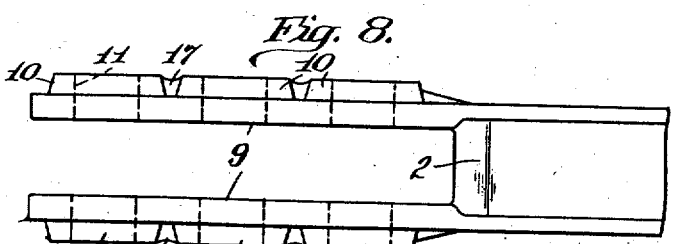
Inventor  
Harry T. Anderson  
by Barnett & Truman  
Attorneys Aug. 10, 1926.
H. T. ANDERSON
1,595,333
CONNECTING BAR AND METHOD OF MAKING THE SAME
Filed June 6, 1924    2 Sheets-Sheet 2
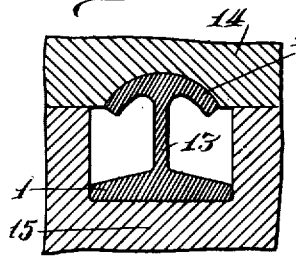
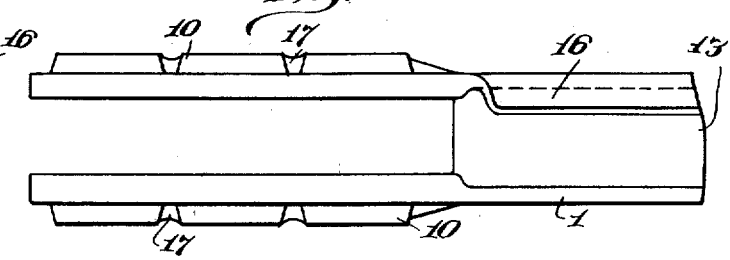
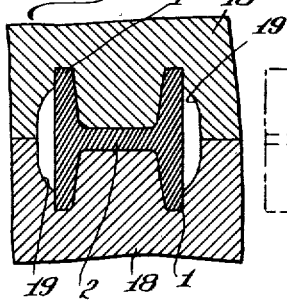
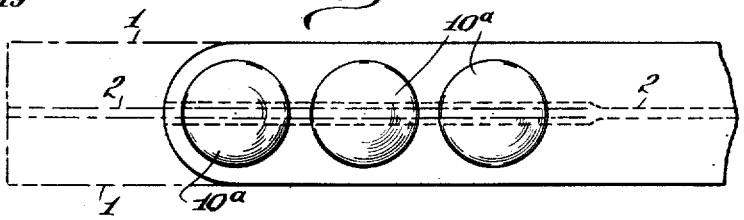
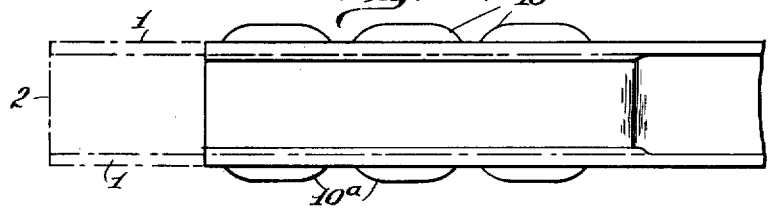
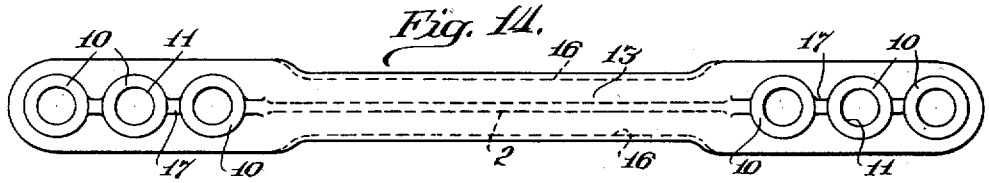
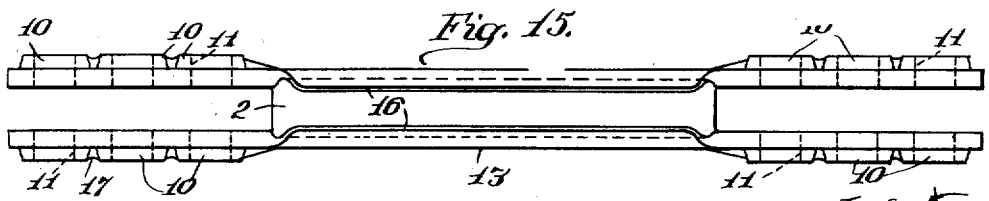
Inventor
Harry T. Anderson
By Barnett + Truman
Attorneys Patented Aug. 10, 1926.

1,595,333

UNITED STATES PATENT OFFICE.

HARRY TEMPLE ANDERSON, OF BUTLER, PENNSYLVANIA, ASSIGNOR OF ONE-HALF TO SOREN HANSSON, OF BUTLER, PENNSYLVANIA.

CONNECTING BAR AND METHOD OF MAKING THE SAME.

Application filed June 6, 1924. Serial No. 718,311.

My invention relates to improved connecting bars, brake levers, and the like, and method of making the same, which bars are particularly suitable for use in connection with railway rolling stock.

Another object of the invention is to form a connecting bar from a commercially rolled piece of metal, such as an I-beam or H-beam these terms being used synonomously, having the ends thickened by upsetting or some similar process and then cutting away the web between the thickened flange portions and providing means in the thickened portion for attaching other members.

A further object of the invention is to provide a process for making connecting bars and the like from commercially rolled sections, such as I-beams or H-beams, by upsetting the ends of the sections to thicken the flanges and web portions thereof adjacent the ends, then forging or otherwise pressing the thickened web portions into the already thickened flanges, to increase the thickness thereof and decrease the thickness of the web portion then cutting away the web portions for forming clevises at the end of the bar and then forming openings in the jaws of the clevises for pins, bolts, or the like.

A still further object of the invention is to provide connecting bars or the like, together with a process of making the same from commercial sections such as I-beams or H-beams, having clevises formed in the ends thereof, which are made by thickening the flanges of the beams by a redistribution of the metal in the beams by upsetting, forging or the like, and cutting away the web between the thickened flanges.

A still further object of the invention is to provide connecting bars and the like formed from commercial shapes having the ends of the bars increased in thickness to compensate for the metal which is removed in producing the necessary bolt or pin holes for attaching other members to the connecting bar.

A still further object of the invention is to provide a process whereby commercial shapes may be employed for devices of the present character by forging such bars to provide clevises at the ends and so fashioning the clevis portions as to strengthen the same and compensate for the metal removed by drilling or otherwise.

The above recited and other objects of my invention will be apparent from the following specification and drawings and will be particularly pointed out in the appended claims.

In the manufacture of connecting bars as at present practiced when forging commercial bars after the usual manner, it has been found that the ends of these bars are weakened because of the drilling of the necessary bolt or pin holes. Where commercial shapes are not employed the expense of producing such bars is considerably in excess of that where commercial shapes are utilized.

In the drawings:

Fig. 1 is a cross sectional view of an I-beam which I employ in the preferred embodiment of my invention.

Fig. 2 is a view similar to Fig. 1 showing a pair of forming dies within which the I-beam is placed.

Fig. 3 is a top plan view of a portion of a bar showing in full lines the manner in which the end of the bar is reduced in length by upsetting and showing in dotted lines the original length of the bar prior to upsetting. This figure also shows in other dotted lines the increase in the thickness of the web of the bar.

Fig. 4 is a side elevational view of the bar of Fig. 3 showing the flanges thickened in a plane perpendicular thereto.

Fig. 5 is a sectional view of dies together with a bar therein, showing a second forging operation.

Fig. 6 is a top plan view of the bar as it appears after the second forging operation.

Fig. 7 is an end view of a clevis made in accordance with my invention after the bolt holes have been drilled therein.

Fig. 8 is a side elevational view of the bar of Fig. 7.

Figs. 9 and 10 are transverse sectional and side elevational views, respectively, showing the manner in which a portion of the bar intermediate the ends may be shaped for strengthening purposes.

Fig. 11 is a transverse sectional view of die having an I-bar therein for forming a modification of my invention.

Fig. 12 is a top plan view of a bar formed in accordance with the dies used in Fig. 11.

Fig. 13 is a side elevational view of a bar formed in accordance with Figs. 11 and 12.

Figs. 14 and 15 are top plan view and side elevational view, respectively, of a completed connecting bar made in accordance with my invention, including the modification of Figs. 11, 12 and 13.

In carrying out the preferred embodiment of my invention, I employ an I-beam of substantially the form shown in Fig. 1, having flanges 1 and a web 2. This beam should be of a length somewhat greater than that of the finished connecting bar or the like which is to be formed therefrom. A pair of cooperating die members 3 of a length substantially equal to that of the length of the clevis desired, are brought to the position shown in Fig. 2 near the end of the bar. As will be observed from Fig. 2, the I-beam does not completely fill the recesses in the die member 3, leaving spaces 4 and 5 for the redistribution of the metal under the upsetting operation. The I-beam together with the die 3 is suitably secured in an upsetting machine with the portion indicated in dotted lines in Figs. 3 and 4 projecting. An upsetting member of any usual type (not shown) is brought into engagement with the end of the beam as shown in dotted lines and moved toward the die 3, thus shortening the length of the bar and causing that portion of the metal within the dies to flow into the spaces defined by the dies and thus be redistributed throughout the length of the bar enclosed within the dies. The final shape assumed by the redistribution of the metal incident to the upsetting operation is than defined in full lines in the dies shown in Fig. 2 and as appears in full lines in Figs. 3 and 4 of the drawings. In Fig. 3 the dotted lines along the web indicate the thickened web, while Fig. 4 indicates the thickened flanges of the bar as the result of redistribution of metal therein. The opposite end of the bar (not shown) is operated upon in a similar manner for producing a similar formation at that end.

In order to eliminate as far as possible the waste of material, I subject the ends of the bar fashioned in accordance with the manner just above described, to a further forging operation, employing dies similar to those shown in Fig. 5. In this operation the web is reduced to a very thin section and the redistribution of metal caused by such thinning of the web is made by causing the excess metal of the web to flow into the already thickened flanges of the bar and into the spaces shown in full lines 10 of Fig. 5. These recesses may be shaped to provide bosses 9 as shown in full lines in Fig. 6. Squeezing the web in this manner causes the metal thereof to move into the flanges of the bar and also causes some of the metal of said flanges to flow into the pockets 9 forming the bosses 10 of the bar. If desired, the dies may be fashioned to provide connecting ribs or fillets 17 as shown in Figs. 6 and 8. This second forging operation results in a bar having the flanges thickened to an extent greater than by the first forging or upsetting operation and a web $2^a$ between such flanges which is exceedingly thin in section. This thin web is then cut away between the thickened flanges and is cut from the adjoining web portion. Due to the upsetting operation the web immediately adjacent this cut-away portion will be spread or swelled somewhat as shown in dotted lines in Fig. 6. This enlarged web portion at this point greatly increases the strength of the device when finished. Suitable bolt or pin holes are then drilled or otherwise formed in the thickened flanges of the clevises which holes are indicated at 11. When both ends of such bar have been acted upon to form clevises at each end the appearance of one of the ends of the bar will be similar to that shown in Fig. 8 of the drawings.

In order to increase the strength of the bar against bending and also to provide clearance for any members of a brake rigging or like structure with which such connecting bar may be employed, I may bend down the flanges of the bar intermediate the clevis portions thereof by subjecting the intermediate portion of the bar to dies such as shown in Fig. 9 and bending down the flanges as indicated. If desirable, the lower flange could then be bent upwardly to correspond in curvature to the bent flange 16 shown in Figs. 9 and 10 of the drawings.

In Figs. 11, 12 and 13, there is shown a bar made from dies, which as the result of the first upsetting operation, form circular pads $10^a$ on the outer flanges of the ends of the bar which pads are not connected by fillets, as in Fig. 8. In Figs. 11, 12 and 13, the dies 18 are formed with recesses 19 to provide the pads $10^a$ so that when the plunger of the upsetting machine is brought against the end of the bar as shown in dotted lines in Figs. 12 and 13, the redistribution of the metal causes the same to flow into the pad-like recesses in the dies with the result as shown in Figs. 12 and 13. In this upsetting operation as well as in the first one described, the web is thickened as indicated by dotted lines in Fig. 12 and the web is here again thinned by a second forging operation similar to that described heretofore, whereupon the metal of the thickened web is redistributed by causing the same to flow into the thickened flanges increasing the thickness of the same as well as decreasing the thickness of the web. In a similar manner the web is then cut away and bolt or pin holes formed in the pads $10^a$ of the bar.

Figs. 14 and 15 show a completed connecting bar made in accordance with the preferred embodiment of the invention as hereinbefore described.

The process of my invention consists in providing a bar of I-beam or H-bar section, as desired, upsetting the ends thereof while retained within dies, thus thickening the flanges and webs of the upset portion, then causing a redistribution of the metal of the web by forging, causing the same to flow into the already thickened flanges for increasing the thickness thereof, then cutting away the thin web portion and then providing bolt or pin holes in the thickened flanges of the clevis. It will be observed that by my invention I am enabled to employ ordinary commercial rolled sections such as I-beams or H-bars and to provide clevises at the ends of these bars having thickened flanges to compensate for the metal which is drilled or otherwise removed for the reception of connecting bolts or pins, thereby providing a connecting bar, brake lever or the like of rolled sections, which is highly efficient and possesses sufficient strength for successful commercial use.

While I have described more or less precisely the details of construction of my invention, yet I do not wish to be understood as limiting myself thereto, as I contemplate changes in form and proportion of parts and a substitution of equivalents as circumstances may suggest or render expedient, without departing from the spirit and scope of my invention.

I claim:

1. A connecting bar made from a single piece of metal of rolled section having a clevis formed in an end thereof, the walls defining said clevis being thickened by upsetting.

2. A connecting bar formed from a metal blank of I-beam shape having its ends upset to thicken the flanges thereof, with clevises formed therein by cutting away the web portions between the thickened flanges.

3. A connecting bar formed from a metal blank of I-beam shape having its ends upset to thicken the flanges thereof, with clevises formed therein by cutting away the web portions between the thickened flanges, said flanges having openings therein for receiving attaching members.

4. A connecting bar made from a rolled I-beam having clevises at each end thereof, the jaws of said clevises being thickened by reducing the length of said beam under pressure.

5. A connecting bar formed from a single piece of I-beam section, each end of said bar being provided with a clevis, each clevis having walls fashioned from the flanges of said beam and thickened by upsetting the ends of the beam, the thickness of said clevis walls being in a direction parallel to the web of the beam, the web of the beam between the thickened flange members being cut away.

6. A connecting bar formed from a uniform rolled metal section comprising flanges and a connecting web, the web being cut away at the ends forming jaws, said jaws being previously upset to thicken the same.

7. The method of making connecting bars, which consists in providing a blank, upsetting one end of said blank to thicken its walls by forcing the same toward the transverse center line of the bar, and forming attaching means in said upset portion.

8. The method of making connecting bars, which consists in providing a blank of greater length than that required for the completed article, applying pressure to one end of said bar in a direction longitudinal thereof, to thicken the same, and forming holes in said thickened portion.

9. In the manufacture of connecting bars, the step that comprises longitudinally upsetting one end of an I-beam, and thereby thickening both the web and the flanges of the end portion of said beam.

10. In the manufacture of connecting bars, the process that comprises longitudinally upsetting one end of an I-beam thereby thickening both the web and the flanges of the end portion of said beam, and then further thickening the said flanges and forming enlargements thereof by applying forging pressure to the thickened flange and web portions of said beam.

11. The method of making connecting bars, which consists in providing a blank of greater length than that required for the completed article, applying pressure longitudinally of said blank to thicken the same adjacent to one end, applying pressure to the blank intermediate the edges of the thickened portion to reduce the thickness thereof at said intermediate point, and cutting away said reduced portion to form a clevis.

12. The method of making connecting bars, thereby thickening the flanges of the beam which consists in providing an I-beam, upsetting one end of said beam, and forming attaching means on said upset portion.

13. Method of forming connecting bars from I-beams which comprises upsetting an end portion of the bar to thicken the flanges thereof and removing the portion of the web between said thickened flanges to form a clevis.

14. The method of making connecting bars, which consists in providing an I-beam of greater length than that required for the completed article, upsetting each end of said beam, and forming longitudinal bosses intermediate the sides of said upset portions, and forming holes in said sides.

15. The method of making connecting bars, which consists in providing a bar of greater length than that required for the completed article, placing recessed dies upon opposite sides of said bar, applying pressure longitudinally of said bar to cause the material of the bar to fill the recesses in said dies, to increase the thickness of the sides, removing the material at said intermediate point, and forming holes in said thickened sides.

16. The method of making connecting bars, which consists in providing an I-beam of greater length than that of the finished article, upsetting an end of the beam and thereby thickening the flanges and web, and then displacing a portion of the web to further thicken the flanges and form a clevis, a portion of the thickened web remaining to reinforce the end of the web where the clevis joins the main bar.

17. A connecting bar formed from a uniform metal section comprising side flanges and a connecting web, a portion of the web at the end of the bar being displaced to form jaws, the jaws and the remaining end of the web being thickened by upsetting the end of the metal section.

18. Method of forming connecting bars from I-beams which comprises upsetting the end portion of the bar to thicken the flanges thereof, and subjecting the end portion of the web to lateral pressure to cause the metal to flow from the web into the flanges.

19. Method of forming connecting bars from I-beams which comprises upsetting the end portion of the bar to thicken the flanges thereof, subjecting the end portion of the web to lateral pressure to cause the metal to flow from the web into the flanges, and then cutting away the thinned portion of the web to form a clevis.

HARRY TEMPLE ANDERSON.

opposite sides of said bar, applying pressure longitudinally of said bar to cause the material of the bar to fill the recesses in said dies, to increase the thickness of the sides, removing the material at said intermediate point, and forming holes in said thickened sides.

16. The method of making connecting bars, which consists in providing an I-beam of greater length than that of the finished article, upsetting an end of the beam and thereby thickening the flanges and web, and then displacing a portion of the web to further thicken the flanges and form a clevis, a portion of the thickened web remaining to reinforce the end of the web where the clevis joins the main bar.

17. A connecting bar formed from a uniform metal section comprising side flanges and a connecting web, a portion of the web at the end of the bar being displaced to form jaws, the jaws and the remaining end of the web being thickened by upsetting the end of the metal section.

18. Method of forming connecting bars from I-beams which comprises upsetting the end portion of the bar to thicken the flanges thereof, and subjecting the end portion of the web to lateral pressure to cause the metal to flow from the web into the flanges.

19. Method of forming connecting bars from I-beams which comprises upsetting the end portion of the bar to thicken the flanges thereof, subjecting the end portion of the web to lateral pressure to cause the metal to flow from the web into the flanges, and then cutting away the thinned portion of the web to form a clevis.

HARRY TEMPLE ANDERSON.

Certificate of Correction.

It is hereby certified that in Letters Patent No. 1,595,333, granted August 10, 1926, upon the application of Harry Temple Anderson, of Butler, Pennsylvania, for an improvement in "Connecting Bars and Methods of Making the Same," errors appear in the printed specification requiring correction as follows: Page 2, line 36, for the word "than" read *that;* page 3, lines 110 and 111, claim 12, strike out the words "thereby thickening the flanges of the beam" and insert the same to follow after the word "beam" in line 112, same claim; and that the said Letters Patent should be read with these corrections therein that the same may conform to the record of the case in the Patent Office.

Signed and sealed this 28th day of September, A. D. 1926.

[SEAL.]

M. J. MOORE,
*Acting Commissioner of Patents.*

Certificate of Correction.

It is hereby certified that in Letters Patent No. 1,595,333, granted August 10, 1926, upon the application of Harry Temple Anderson, of Butler, Pennsylvania, for an improvement in "Connecting Bars and Methods of Making the Same," errors appear in the printed specification requiring correction as follows: Page 2, line 36, for the word "than" read *that;* page 3, lines 110 and 111, claim 12, strike out the words "thereby thickening the flanges of the beam" and insert the same to follow after the word "beam" in line 112, same claim; and that the said Letters Patent should be read with these corrections therein that the same may conform to the record of the case in the Patent Office.

Signed and sealed this 28th day of September, A. D. 1926.

[SEAL.]
M. J. MOORE,
*Acting Commissioner of Patents.*